Dec. 4, 1928. 1,694,114
F. V. ANDERSON
PRESS
Filed July 14, 1926
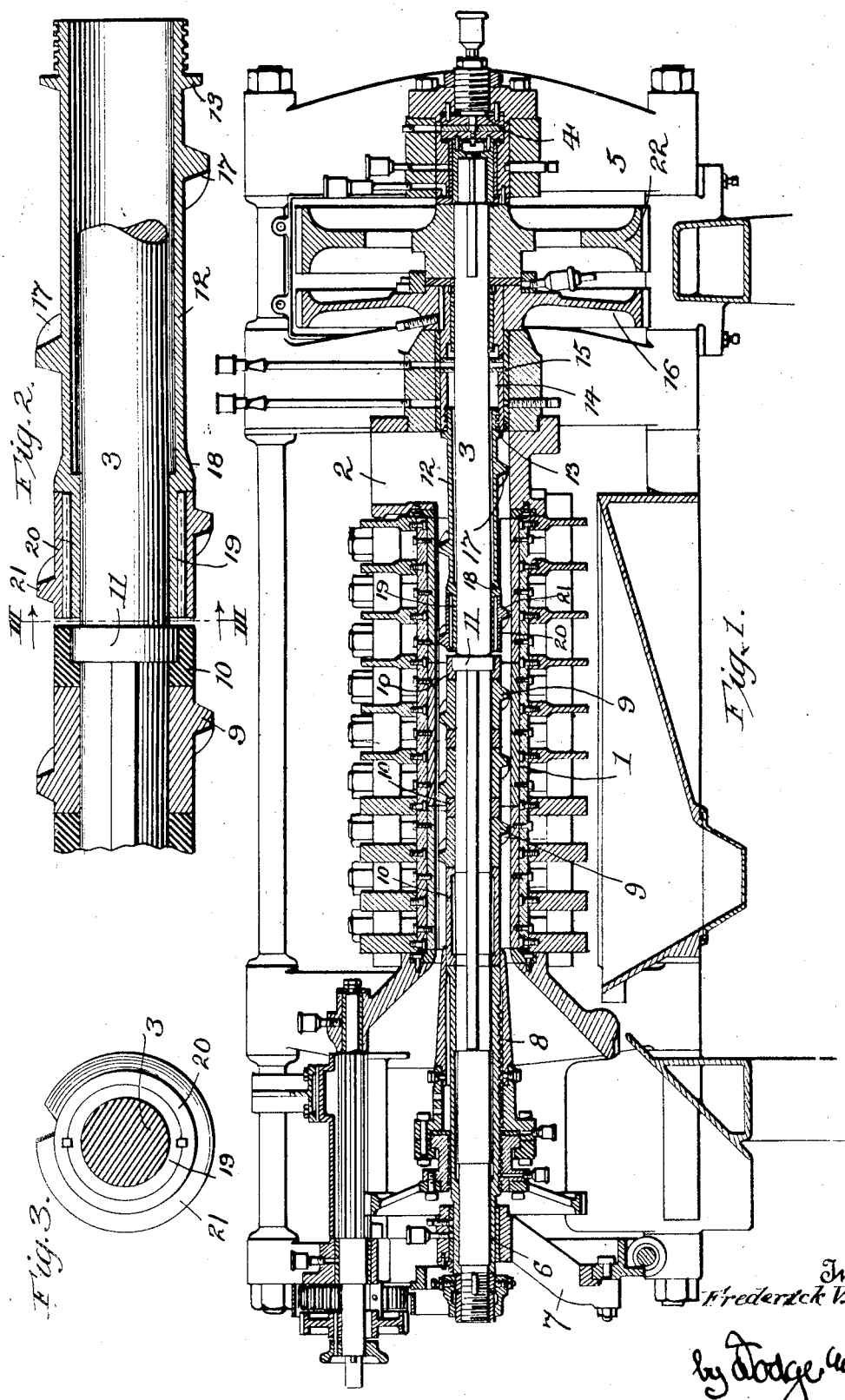
Inventor:
Frederick V. Anderson
by Dodge and Sons
Attorneys Patented Dec. 4, 1928.

1,694,114

UNITED STATES PATENT OFFICE.

FREDERICK V. ANDERSON, OF LAKEWOOD, OHIO, ASSIGNOR TO THE V. D. ANDERSON COMPANY, OF CLEVELAND, OHIO, A CORPORATION OF OHIO.

PRESS.

Application filed July 14, 1926. Serial No. 122,413.

This invention pertains to improvement in presses and more particularly to presses of the type shown in Letters Patent No. 731,737 dated June 23, 1903.

In the structure shown in that patent there is disclosed a shell or barrel; a feed hopper at one end, and a restricted discharge opening at the other end. Extending through the barrel and through the hopper is a shaft which, at the hopper end, provides a support for a quill or sleeve having formed thereon a feeding worm or screw, the shaft also carrying beyond the quill a series of separated worms which effect compression of the material as well as advancing it through the shell. Means was also provided to rotate the shaft and also the quill.

Experience has demonstrated that the inner end of the quill wears away faster than the remainder and, under the construction heretofore employed, it was necessary to substitute an entire new quill and it was likewise necessary to remove the shaft from the press to effect such substitution, a some tedious and expensive operation.

It is the main object of this invention to provide a new quill formation and to so arrange the parts that substitution for the worm quill part may be effectuated without necessarily removing the shaft.

In the annexed drawings:

Figure 1 is a vertical longitudinal section of a press embodying my invention,

Figure 2 an enlarged detail, sectional view of the quill, a portion of the shaft and one of the pressing worms, and Figure 3 a cross sectional view on the line III—III of Figure 2.

Referring to Figure 1, 1 denotes the shell or barrel of the press provided at its head end with a hopper 2. A shaft 3 extends through the barrel and hopper having one end supported by a suitable thrust bearing 4 carried by the frame work 5 of the press at the head end thereof. The shaft at its opposite end is supported in a bearing 6 carried by removable frame elements 7. The adjustable cone employed in conjunction with the discharge opening at the end of the barrel is denoted by 8. These elements and the allied parts may be readily removed when it becomes necessary to remove the pressing worms 9 and the spacing collars 10 from the shaft; it being understood that the shell may be opened up as in the patent above referred to.

The shaft 3, see Figures 1 and 2, is formed with an annular shoulder 11 and forms an abutment to take up the thrust exerted on the worms 9 when the press is in operation.

The quill surrounds the shaft to the right of the shoulder and may be said to comprise a tubular member 12 having a collar 13 at one end, which end is threaded externally and screws into a sleeve 14 mounted in a bearing 15 and attached to a driving gear 16.

The quill is provided with a feed worm 17 the inner end whereof stops short of an outwardly inclined face or enlargement 18, beyond which the quill is reduced in diameter as at 19. Mounted upon such reduced portion, or inner end is a sleeve 20 having formed integral therewith a worm or flight 21, the sleeve being keyed to the reduced section 19 so that it rotates as one with the quill.

Shaft 3 will be driven by suitable means as through a gear 22 driven from any suitable source. The quill and shaft may be driven in unison or at different speeds according to the material undergoing treatment.

As before the innermost flight 21 of the quill is that which is subjected to the greatest wear, hence by making it replaceable it is not necessary to substitute a whole new quill. Aside from this element of economy, the time element in removal and replacement are items of considerable moment. By opening up the press shell and swinging the upper section away from the shaft the worms are exposed. Then by removing the elements 6, 7 and 8, and their allied parts, the worms 9 and collars 10 may be removed and the sleeve 20 loosened and slipped over the collar 11 and removed from the shaft. When a new sleeve has been substituted, the other parts may be readily replaced.

What is claimed is:

1. A feeding and compression element for a press of the character herein described, comprising a quill-like member having a flight thereon, one end of said member being reduced in diameter; and a sleeve mounted on and secured to said reduced portion, said sleeve being likewise formed with a flight.

2. A feeding and compression element for a press of the character herein described, comprising a quill-like member having one end reduced in diameter with that portion of the body of the quill next adjacent the reduced section merging into the exterior surface of the quill body on an angle; and a sleeve mounted on and secured to said reduced portion, said sleeve being likewise formed with a flight.

3. A shaft assembly for screw presses comprising in combination a shaft; a pair of bearings for said shaft one of which may be readily dismounted; a thrust abutment on the shaft; a quill rotatable on the shaft independently thereof; at least one pressing element removably mounted on said shaft to turn therewith in thrust engagement with said abutment; and a feeding element removably mounted on said quill and capable of withdrawal over said abutment while the quill and shaft remain assembled.

4. A shaft assembly for screw presses comprising in combination a shaft having a thrust collar between its ends; a main bearing and a thrust bearing for one end of the shaft; a quill encircling the shaft between said main bearing and said thrust collar and rotatable independently of the shaft; a demountable bearing for the other end of the shaft; screw pressing means encircling the shaft removably mounted thereon to turn therewith and in thrust engagement with said collar; and a screw feeding element removably mounted on said quill and withdrawable over said collar upon the removal of the second bearing and said screw-pressing means.

5. A shaft assembly for screw presses comprising in combination a shaft having a thrust collar; screw pressing means removably mounted on said shaft in thrust engagement with said collar; releasable means for locking said pressing means upon said shaft; a quill encircling said shaft at the opposite side of said collar; a screw feeding element removably mounted on said quill and withdrawable over said collar; and means for fixing said feeding element in position on said collar.

6. A shaft assembly for screw presses comprising in combination a shaft having a thrust collar near its mid-length; screw pressing means removably mounted on said shaft in thrust engagement with said collar; a quill swiveled on said shaft at the opposite side of said collar; a feeding flight formed integrally with said quill; and a second feeding flight removably mounted on the end of said quill adjacent said collar and withdrawable over said collar while said quill and shaft are assembled.

In testimony whereof I have signed my name to this specification.

FREDERICK V. ANDERSON.